United States Patent
Domig et al.

(10) Patent No.: US 9,145,160 B2
(45) Date of Patent: Sep. 29, 2015

(54) PLAIN BEARING FOR A STEERING SPINDLE

(71) Applicant: THYSSENKRUPP PRESTA AKTIENGESELLSCHAFT, Eschen (LI)

(72) Inventors: Markus Domig, Bartholomäberg (AT); Thomas Raich, Vandans (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/407,553

(22) PCT Filed: May 7, 2013

(86) PCT No.: PCT/EP2013/001345
§ 371 (c)(1),
(2) Date: Dec. 12, 2014

(87) PCT Pub. No.: WO2013/185868
PCT Pub. Date: Dec. 19, 2013

(65) Prior Publication Data
US 2015/0191195 A1  Jul. 9, 2015

(30) Foreign Application Priority Data

Jun. 14, 2012  (DE) .......... 10 2012 105 151

(51) Int. Cl.
*F16C 27/06* (2006.01)
*B62D 1/184* (2006.01)
(Continued)

(52) U.S. Cl.
CPC .............. *B62D 1/184* (2013.01); *F16C 29/002* (2013.01); *F16C 29/02* (2013.01)

(58) Field of Classification Search
CPC ...... F16C 27/02; F16C 27/062; F16C 29/002; B62D 1/185

USPC .............. 384/10, 37, 38, 215, 220, 222, 196; 74/492; 464/161, 160

See application file for complete search history.

(56) References Cited

U.S. PATENT DOCUMENTS 2,485,538 A * 10/1949 Rowe ........................ 381/62
2,851,314 A    9/1958 Thomson
(Continued)

FOREIGN PATENT DOCUMENTS

DE    2206193 A1   8/1973
DE    3041882 A1   6/1982
(Continued)

OTHER PUBLICATIONS

German Language International Search Report for International patent application No. PCT/EP2013/001345; mailing date Nov. 7, 2013.
(Continued)

Primary Examiner — Phillip A Johnson
(74) Attorney, Agent, or Firm — ThyssenKrupp North America, Inc.

(57) ABSTRACT

In a plain bearing for a steering spindle of a steering column for a motor vehicle having an inner ring for receiving and slidingly mounting the steering spindle, the inner ring is surrounded by an outer ring, and elastic intermediate pieces are arranged between the inner ring and the outer ring. A respective elastic intermediate piece holds the inner ring at the location of the intermediate piece at a spacing from the outer ring in relation to the radial direction in the unloaded state of the plain bearing and can be compressed in the case of a force which acts on the inner ring and is directed outwards in the radial direction, the inner ring bearing against the outer ring if a limiting value of the radial force is exceeded.

14 Claims, 4 Drawing Sheets

(51) Int. Cl.
*F16C 29/00* (2006.01)
*F16C 29/02* (2006.01)

(56) References Cited

U.S. PATENT DOCUMENTS

| | | | |
|---|---|---|---|
| 5,669,718 A * | 9/1997 | Sakairi et al. | 384/220 |
| 5,797,685 A | 8/1998 | Jurik et al. | |
| 2005/0087970 A1 * | 4/2005 | Ulintz | 280/775 |

FOREIGN PATENT DOCUMENTS

| EP | 0719695 | A2 | 7/1996 |
|---|---|---|---|
| EP | 0755843 | A1 | 1/1997 |
| EP | 0836980 | A2 | 4/1998 |
| FR | 2656393 | A1 | 6/1991 |
| GB | 1275417 | A | 5/1972 |

OTHER PUBLICATIONS

English Translation of International Search Report for International patent application No. PCT/EP2013/001345; mailing date Nov. 7, 2013.
English translation of abstract for FR 2656393 (A1).
English translation of abstract of EP 0755843 (A1).
English translation of abstract of DE 3041882 (A1).

* cited by examiner

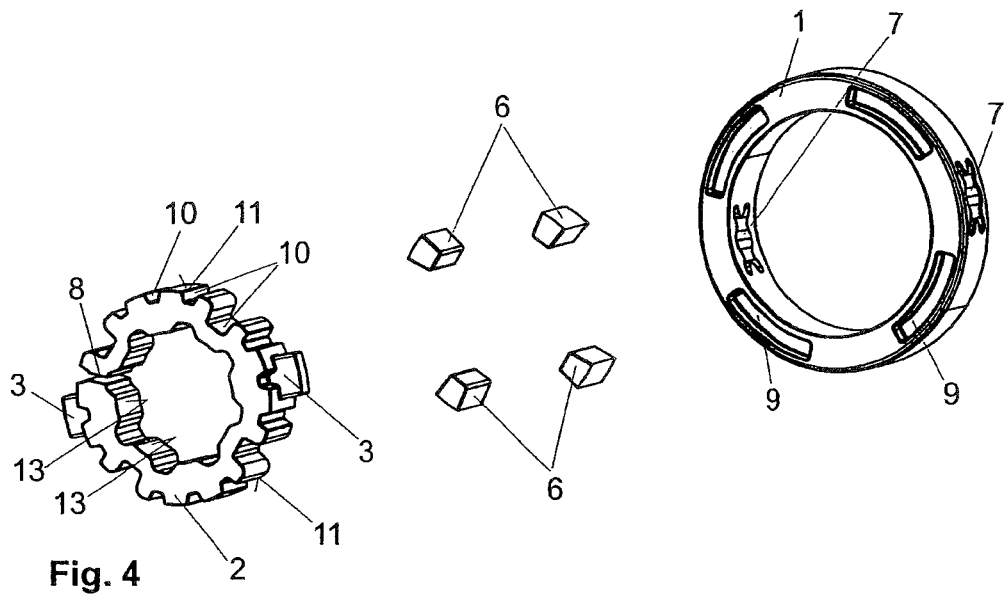
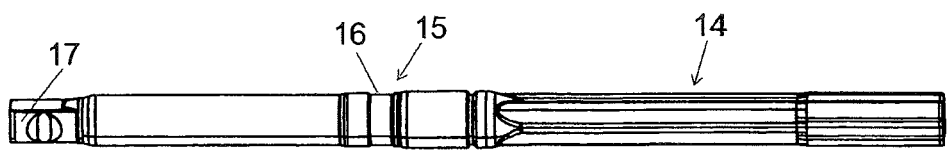
Fig. 4
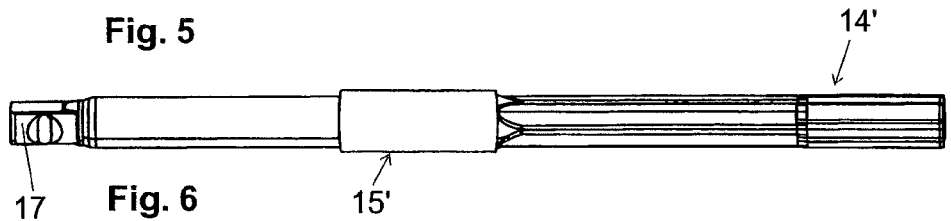
Fig. 5
Fig. 6
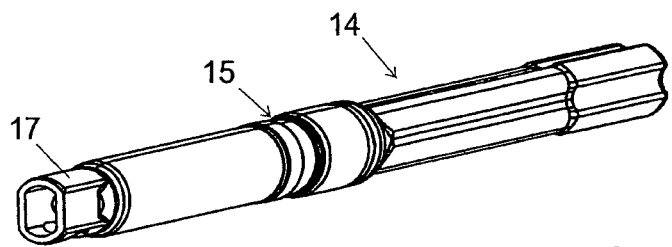
Fig. 7
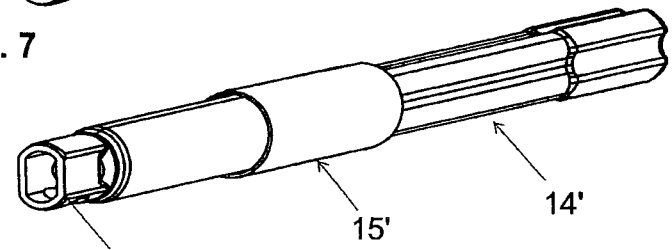
Fig. 8

PLAIN BEARING FOR A STEERING SPINDLE

CROSS REFERENCE TO RELATED APPLICATIONS

This application is a U.S. National Stage Entry of International Patent Application Ser. No. PCT/EP2013/001345, filed May 7, 2013, which claims priority to German patent application no. 102012105151.8, filed Jun. 14, 2012.

FIELD

The invention relates to a plain bearing for a steering spindle of a steering column for a motor vehicle having an inner ring for receiving and slidingly mounting the steering spindle. Furthermore, the invention relates to a steering column for a vehicle having a plain bearing of this type.

BACKGROUND

Adjustable-length steering columns are known, in which the casing unit which rotatably mounts a shaft of the steering spindle, which shaft supports the steering wheel, can be adjusted in the longitudinal direction of the steering spindle. Here, in one advantageous embodiment, the steering spindle has two shafts which can be telescoped with respect to one another, the rear shaft (in relation to the driving direction) which adjoins the steering wheel being mounted rotatably with respect to the casing unit via first and second anti-friction bearings and being held non-displaceably in the axial direction. The front shaft which can be telescoped with respect to the rear shaft is mounted rotatably by means of a third bearing which is formed by a plain bearing with respect to a housing part of the steering column, which housing part is non-displaceable in the axial direction of the steering shaft. Here, said plain bearing supports the lower shaft against axial displacement with respect to the housing part which mounts it.

In a steering column of this type, in which the rear shaft is mounted in the casing unit by way of two bearings, the arrangement of a third bearing leads to redundancy which leads to a technically satisfactory result only by way of narrow tolerance requirements. Here, in order for it to be possible to compensate for knocking of the shaft, which knocking is caused by tolerances of the shaft and its mounting via the first and second bearing, the third bearing is conventionally configured as a swinging bearing. The swinging bearing is arranged in a bearing housing which surrounds it, forms the interface between the swinging bearing and that part of the steering column which holds the third bearing, and serves to compensate for tolerances. In order to provide overload protection for the third bearing, a steel disc is arranged on the shaft axially next to the third bearing. High forces which act on the third bearing in the radial direction are produced, for example, during the slipping coupling test for the latching star which is usually positioned directly next to the third bearing. Said latching star serves, together with a latching pin which engages into it, to form a steering wheel lock. If the steering wheel is rotated with a high force in the closed state of the steering wheel lock, the latching star has to be capable of slipping on the shaft.

One disadvantage of the described conventional configuration of the plain bearing is its multiple-piece construction (swinging bearing, bearing housing, steel disc) with the associated costs and the resulting weight of the arrangement.

EP 0 836 980 B1 has disclosed a plain bearing for rotatably mounting a shaft of a steering spindle, which plain bearing comprises a sleeve and a holder. The sleeve has a cylindrical section and, protruding axially from the latter, a plurality of projections which are separated by way of slots and the axial end sections of which form the bearing face on their inner sides. On their outer sides which lie opposite, the projections have latching lugs. The holder is snapped via the latching lugs onto the projections and has a planar section which lies at a right angle with respect to the longitudinal axis and oblique holding tongues which project radially to the outside beyond the planar section of the holder. Said holding tongues block a movement of the bearing with respect to the housing part which receives the bearing in the axial direction.

SUMMARY

It is an object of the invention to provide an inexpensive and weight-saving plain bearing of the type mentioned at the outset, by which deviations of the shaft of the steering spindle, which shaft is mounted by the plain bearing, with respect to a centred and/or axially oriented position can be absorbed in a limited manner at the location of the plain bearing, and by which high radial forces can be absorbed.

BRIEF DESCRIPTION OF THE DRAWINGS

The present disclosure is described in detail below with reference to the attached drawing figures, wherein:

FIG. 4 is an exploded perspective view of the plain bearing of FIG. 1.

FIGS. 5 and 6 are side views of two separate embodiments of shafts of steering spindles which are configured to be mounted by a plain bearing of the present disclosure.

FIGS. 7 and 8 are perspective views of the respective shafts of FIGS. 5 and 6.

DETAILED DESCRIPTION

Figure 1:
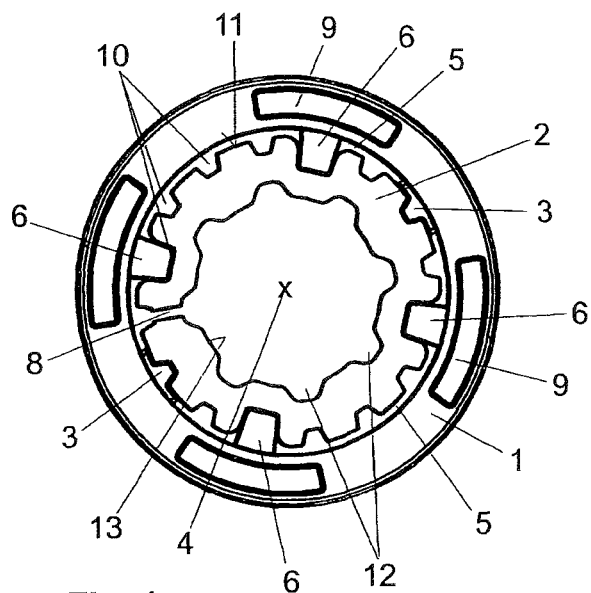
FIG. 1 is a front elevation view of an embodiment of a plain bearing of the present disclosure, as viewed in the direction of a longitudinal central axis of the plain bearing.
Figure 3:
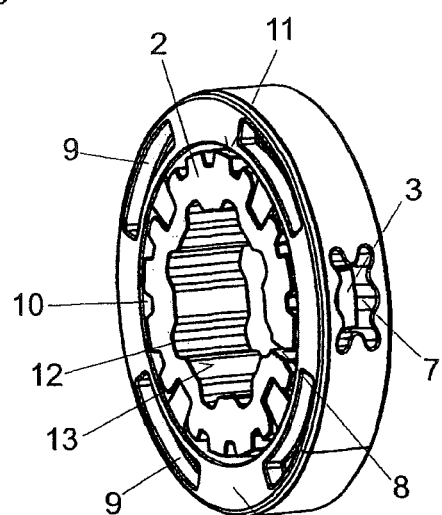
FIG. 3 is a perspective view of the plain bearing of FIG. 1.
Figure 2:
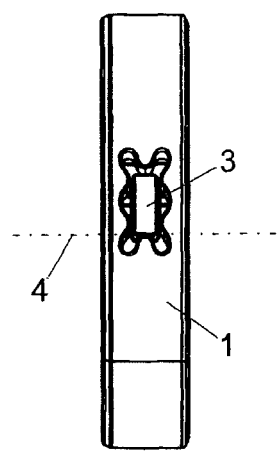
FIG. 2 is a side elevation view of the plain bearing of FIG. 1.

In the plain bearing according to the invention, the inner ring which, in the use state, surrounds and slidingly mounts the steering spindle is surrounded by an outer ring, elastic intermediate pieces being arranged between the inner ring and the outer ring, which elastic intermediate pieces bridge the gap which is present between the inner ring and the outer ring. In the unloaded state of the plain bearing, the elastic intermediate pieces hold the inner ring at a spacing from the outer ring in relation to the radial direction. In the case of a force which acts on the inner ring and is directed in the radial direction, a displacement of the inner ring in the radial direction occurs, at least one of the elastic intermediate pieces being compressed. If a limiting value for the radial force is exceeded, the inner ring bears against the outer ring. The spacing between the outer ring and the inner ring, the value of which was first of all greater than zero in the region of the intermediate piece, has then been reduced as far as zero in the region of the respective intermediate piece as a consequence of the compression of the respective intermediate piece.

Here, the region which is arranged directly next to or spaced apart next to the respective intermediate piece can be called the region of the intermediate piece. The radial force which exceeds the limiting value is therefore transmitted directly from the inner ring to the outer ring.

A plain bearing according to the invention can advantageously be of very light configuration, said plain bearing having a high stability. Deviations of the mounted shaft in the radial direction with respect to its axially centred orientation and in its angular position with respect to its parallel arrangement with respect to the provided longitudinal axis can be absorbed over a limited range. If said range is exceeded, forces can be transmitted directly from the inner ring to the outer ring.

The radial displacement travel of the inner ring until it bears against the outer ring is preferably at least 0.3 mm starting from its unloaded state in all radial directions, a value of less than 1 mm being preferred.

There are advantageously at least three intermediate pieces which are distributed in the circumferential direction, in particular uniformly, which intermediate pieces are arranged between the inner ring and the outer ring. One possible embodiment provides precisely four intermediate pieces which are spaced apart in each case at an angle of 90° from one another.

At least one lug which protrudes beyond the inner ring radially to the outside and engages into a recess in the outer ring is advantageously arranged on the inner ring. As an alternative or in addition to this, at least one lug which protrudes beyond the outer ring radially to the inside and engages into a recess in the inner ring can be arranged on the outer ring. At least two lugs which are spaced apart from one another in the circumferential direction, in particular uniformly, and in each case engage into a recess in the other of the two rings are preferably arranged on the inner ring and/or on the outer ring. For example, two lugs of this type which lie opposite one another can be arranged on the inner ring and/or on the outer ring.

By way of said lug or lugs which engages/engage into the recess or respective recess, a positively acting stop can be achieved between the inner ring and the outer ring in relation to the circumferential direction (=rotational direction about the longitudinal centre axis of the sliding bearing) and/or in relation to the axial direction. There is advantageously a relatively large play both in the circumferential direction and in the axial direction between the lug or respective lug and the recess, into which it engages. The play in the circumferential direction is preferably at least 0.2 mm, a play of less than 1 mm being preferred. The play in the axial direction is preferably at least 0.2 mm, a play of less than 1 mm being preferred. In the unloaded state of the plain bearing, the (respective) lug can favourably be arranged in a centred manner in the (respective) recess.

If the at least one lug is considered to be part of the ring, on which it is arranged, the internal diameter of the outer ring around the entire circumference is greater than the external diameter of the inner ring, apart from the at least one circumferential point, at which the lug or respective lug lies.

The lug or respective lug can be configured in an integral material manner with the inner ring or outer ring, in particular by way of injection moulding. Another type of fastening is also conceivable and possible in principle, for example by way of adhesive bonding.

In one advantageous embodiment, the inner ring is of slotted configuration, said inner ring having an interruption at a single point of its circumference. As a result, it can be pushed onto the steering spindle as far as the bearing point with an increase in its internal diameter, the elasticity of the material of the inner ring being utilized to increase its internal diameter and the elastic intermediate pieces being compressed. The internal diameter of the inner ring can preferably be widened by at least 3%, particularly preferably by at least 5%. At the bearing point, the steering spindle can favourably have a groove, into which the inner ring snaps. In this way, the plain bearing can support the steering spindle or the corresponding shaft of the steering spindle in the axial direction in a simple way.

The intermediate pieces, the material of which is substantially more elastic, preferably at least five times more elastic, than the material of the inner ring and the material of the outer ring, are favourably composed of an elastomeric material, for example a rubber elastomer. In one possible embodiment, the intermediate pieces are injection moulded on the inner ring and/or on the outer ring. As a result, simple production, logistics and assembly can be achieved. Corresponding injection moulding processes are known as two-component injection moulding processes. Another fastening to the inner ring and/or outer ring, for example by way of adhesive bonding or vulcanizing, is also possible.

A plain bearing according to the invention can advantageously be used for mounting a steering spindle of a steering column which is adjustable in the longitudinal direction of the steering spindle. For the cases, in particular, in which the steering spindle comprises a first and a second shaft which are of telescopic configuration with respect to one another, the plain bearing according to the invention is advantageously used. Here, the plain bearing can favourably support the shaft which is mounted by it in the axial direction.

In one advantageous embodiment, the steering spindle is additionally mounted by two further bearings which are arranged closer to the steering wheel-side end of the steering spindle and which are formed, in particular, by anti-friction bearings.

The two bearings which are arranged closer to the steering wheel-side end of the steering spindle are particularly advantageously both arranged for rotatably mounting the first shaft of the steering spindle which comprises the steering wheel-side end of the steering spindle, and the plain bearing according to the invention is arranged for mounting the second shaft which is arranged such that it can be telescoped with respect to said first shaft.

Further advantages and details of the invention will be explained in the following text using the appended drawing, in which:

One exemplary embodiment of a plain bearing according to the invention is shown in FIGS. 1 to 4.

The plain bearing has an outer ring 1 which surrounds a longitudinal centre axis 4 and can be mounted in a housing part of a steering column, in order to hold the plain bearing in a stationary manner with respect to the housing part. The outer ring 1 is then held in the housing part of the steering column in a rotationally fixed manner and such that it cannot be displaced in the axial direction. Furthermore, the plain bearing has an inner ring 2, by which the shaft of the steering spindle to be mounted is surrounded and is mounted slidingly. The steering spindle is therefore arranged in the interior space which is surrounded by the inner ring 2. Apart from the lugs 3 which are arranged on the inner ring and will be described in further detail below, the external diameter of the inner ring 2 is smaller over its entire circumference, that is to say over the entire extent around the longitudinal centre axis 4 of the plain bearing, than the internal diameter of the outer ring 1. As a result, a gap 5 is formed between the inner ring 2 and the outer ring 1. In a manner which corresponds to the gap width, the inner ring 2 is at a spacing from the outer ring 1 along its circumference.

Elastic intermediate pieces 6 are arranged between the inner ring 2 and the outer ring 1, which elastic intermediate pieces 6 therefore bridge the gap 5 between the inner ring 2 and the outer ring 1. A respective elastic intermediate piece 6 holds the inner ring 2 at the point, at which it is arranged, at a spacing from the outer ring 1 in the radial direction with regard to the longitudinal centre axis 4 if no external forces act on the plain bearing, that is to say in the unloaded state of the plain bearing. In the unloaded state of the plain bearing, the inner ring 2 is centred within the outer ring 1 by way of the intermediate pieces 6, that is to say the inner ring 2 and the outer ring 1 are coaxial with respect to one another.

If a force acts on the inner ring 2 at the location of an intermediate piece 6, which force acts at the location of said intermediate piece towards the outside in the radial direction in relation to the longitudinal centre axis 4 or has at least one component of this type, the respective intermediate piece 6 is thus compressed and the spacing between the inner ring 2 and the outer ring 1 is reduced in a region which is arranged immediately next to or spaced apart next to the respective intermediate piece 6. If a limiting value of the radial force or the radially directed component of the force is exceeded, the intermediate piece 6 is compressed to such an extent that the inner ring 2 bears against the outer ring 1 in regions which lie immediately next to or spaced apart next to (the spacing preferably being less than one sixth of the entire circumference) the intermediate piece 6. The elastic decoupling between the inner ring 2 and the outer ring 1 is therefore cancelled and the inner ring becomes fixed on the outer ring.

There are four elastic intermediate pieces 6 which are spaced apart in the circumferential direction by in each case 90° in the exemplary embodiment. More than four intermediate pieces 6 which are preferably spaced apart uniformly in the circumferential direction might also be provided. Secondly, there might also be only three intermediate pieces 6 which are spaced apart in the circumferential direction, preferably in each case by 120°.

Lugs 3 are arranged on the inner ring 2 at two locations which lie opposite one another in relation to the longitudinal centre axis 4, that is to say at a spacing of 180° in relation to the circumferential direction, which lugs 3 project radially to the outside from the inner ring 2. A respective lug 3 protrudes into a recess 7 in the outer ring 1, in which recess 7 it is received such that it can be displaced in the radial direction. In the exemplary embodiment, the recesses 7 are configured in the form of window openings which radially penetrate the outer ring 1. For example, it would also be conceivable and possible to configure the recesses 7 in the form of blind bore-like depressions which are arranged on the inner surface of the outer ring 1.

The lugs 3 might also be arranged on the outer ring 1 and might protrude into a recess in the inner ring, which recess is configured, for example, as a window opening which radially penetrates the inner ring.

More than two lugs 3 which are preferably spaced apart uniformly in the circumferential direction might also be provided, which lugs 3 protrude into the respective recess 7. It would also be conceivable and possible to provide only one lug 3 on the inner ring 2 or outer ring 1, which lug 3 protrudes into a recess 7 in the other ring 1, 2.

Lugs which are arranged both on the inner ring 2 and on the outer ring 1 and protrude into a respective recess on the other of the two rings 1, 2 are also conceivable and possible.

The axial displaceability of the inner ring with respect to the outer ring can be limited by way of the at least one lug 3 which protrudes into the associated recess 7. Furthermore, as a result, the rotatability of the inner ring 2 with respect to the outer ring 1 can be limited in relation to the longitudinal centre axis 4.

There is preferably a relatively large play of at least 0.2 mm both in the axial direction and in the circumferential direction between a respective lug 3 and the edge of the recess 7, in which it is arranged. In the unloaded state of the plain bearing, the lugs 3 favourably lie in the recesses 7 in a centred manner.

In the exemplary embodiment, the lugs 3 are formed integrally on the inner ring 2, as is preferred.

The inner ring 2 is of slotted (=open) configuration, said inner ring 2 having a slot 8 at a single location of its circumferential extent. As a result, axial pushing of the shaft to be mounted into the ring 2 is made possible or at least facilitated, by it being possible for the internal diameter of the inner ring 2 to be increased with widening of the slot 8. This bending open of the inner ring 2 takes place counter to the elasticity of the material of the inner ring 2. Furthermore, a slot 8 of this type also serves to produce a temperature compensation means, in which the slot width can be reduced or increased.

However, the elasticity of the material of the inner ring 2, just like the elasticity of the material of the outer ring 1, is substantially lower than the elasticity of the material of the intermediate pieces 6. The elasticity of the material of the inner ring 2 and the elasticity of the material of the outer ring 1 are preferably at any rate less than one fifth of the elasticity of the material of the intermediate pieces 6.

The outer ring 1 is provided with a plurality of window openings 9 which are spaced apart from one another in the circumferential direction and penetrate the outer ring 1 in the axial direction. As a result, the flexibility of the outer ring 1 is increased. As a result, greater tolerances of the housing part can be absorbed, into which housing part the outer ring 1 is inserted.

In the exemplary embodiment, the window openings 9 lie in the circumferential regions, in which the intermediate pieces 6 are arranged between the inner ring 2 and the outer ring 1.

The outer ring 1 and the inner ring 2 can be composed, for example, of the same plastic or of different plastics. The inner ring 2 can be configured here overall from a plastic with particularly satisfactory sliding properties, for example from PEEK or from a plastic which consists at least for the large part of PEEK, or can be coated with a plastic of this type in the region of its inner face which faces the shaft to be mounted. Combinations of materials made from PEEK with, in addition, one of the materials PTFE and/or graphite and/or carbon fibres can advantageously also be used. An approximately 10% volumetric proportion of PTFE and an approximately 30% proportion of graphite and an approximately 30% proportion of carbon fibres have proven advantageous.

For example, PEEK, PTFE or POM may be suitable as plastic for the outer ring and/or the base material of the inner ring.

The intermediate pieces 6 are composed of an elastomeric material, preferably of a rubber elastomer; the intermediate pieces 6 might also be called rubber buffers.

On its outer side which faces the outer ring 1, the inner ring 2 has a plurality of depressions 10 which are distributed over its circumference. The outer surfaces of the elevations which lie between said depressions 10 form bearing faces 11 for contact with the inner side of the outer ring 1 when the inner ring 2 becomes fixed against the outer ring 1. The intermediate pieces 6 protrude into depressions 10 of this type on the outer side of the inner ring 2 and are held in them, for example by way of injection moulding onto the inner ring 2 or by way of adhesive bonding.

On its inner side which faces away from the outer ring 1 and therefore faces the longitudinal centre axis 4, the inner ring 2 has a plurality of depressions 12 which are distributed over its circumference. The inner surfaces of the elevations which lie between the depressions 12 form the sliding face 13 which interacts with the shaft to be mounted. In the unloaded state of the plain bearing, the size of the gap 5 between those sections of the sliding face 13 which are formed by the respective elevations and the inner face of the outer ring 1 is favourably identical over the entire circumference. The elasticity of the inner ring 2 is increased by way of the depressions 10, 12.

A first exemplary embodiment for a shaft 14 which can be mounted by the plain bearing according to the invention and is part of a steering spindle of a steering column is shown in FIGS. 5 and 7. Over a section of its longitudinal extent, said shaft 14 has a cross-sectional shape which differs from the circular shape, in particular a "cloverleaf shape", in order to be connected to a further shaft of the steering spindle fixedly in terms of rotation, but axially displaceably (=telescopic). Said further shaft then has a cavity which extends in the axial direction with a corresponding inner circumferential contour in a known way.

At the bearing point 15, at which the shaft 14 is mounted slidingly by the plain bearing, the shaft 14 has an annular groove 16. When the shaft 14 is pushed axially into the inner ring 2, the latter first of all expands radially with widening of the slot 8 (with compression of the intermediate pieces 6), until the annular groove 16 reaches the inner ring 2 and the inner ring 2 snaps into the annular groove 16. As a result, the shaft 14 can be supported axially by the plain bearing.

At the end which lies opposite the cloverleaf contour, the shaft 14 in the exemplary embodiment is configured with a connecting pin 17, via which the shaft 14 is connected to a cardan joint, and a via the latter to further parts (not shown) of a steering device.

FIGS. 6 and 8 show a further possible embodiment of a shaft 14' to be mounted by a plain bearing according to the invention. Here, the shaft 14' has a continuous cylindrical surface in the region of the bearing point 15' and in sections of its longitudinal extent which adjoin said region axially on both sides. In the case of the shaft 14', the plain bearing therefore does not provide any axial support.

Figure 9:
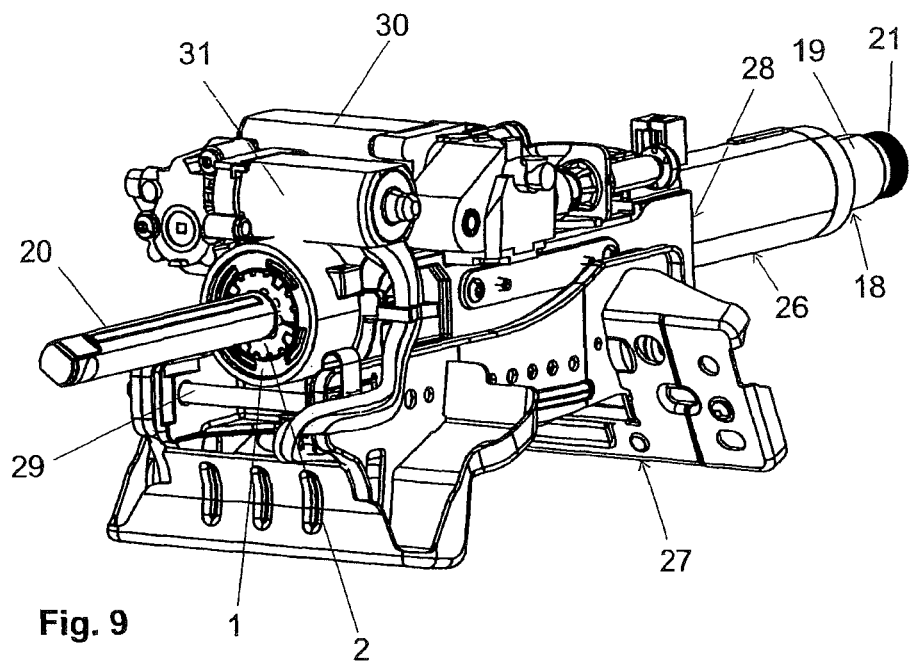
FIG. 9 is perspective view of an embodiment of a steering column having a steering spindle that is mounted by a plain bearing of the present disclosure.
Figure 10:
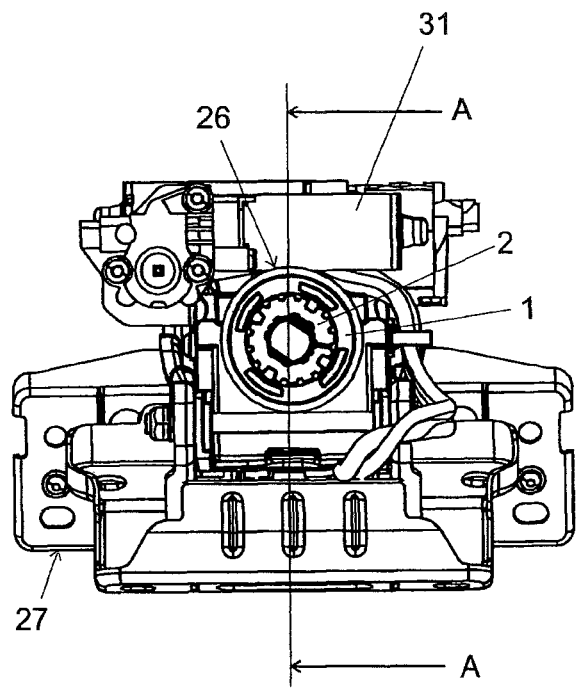
FIG. 10 is a front plan view of an embodiment of a steering column having a steering spindle that is mounted by a plain bearing of the present disclosure.
Figure 11:
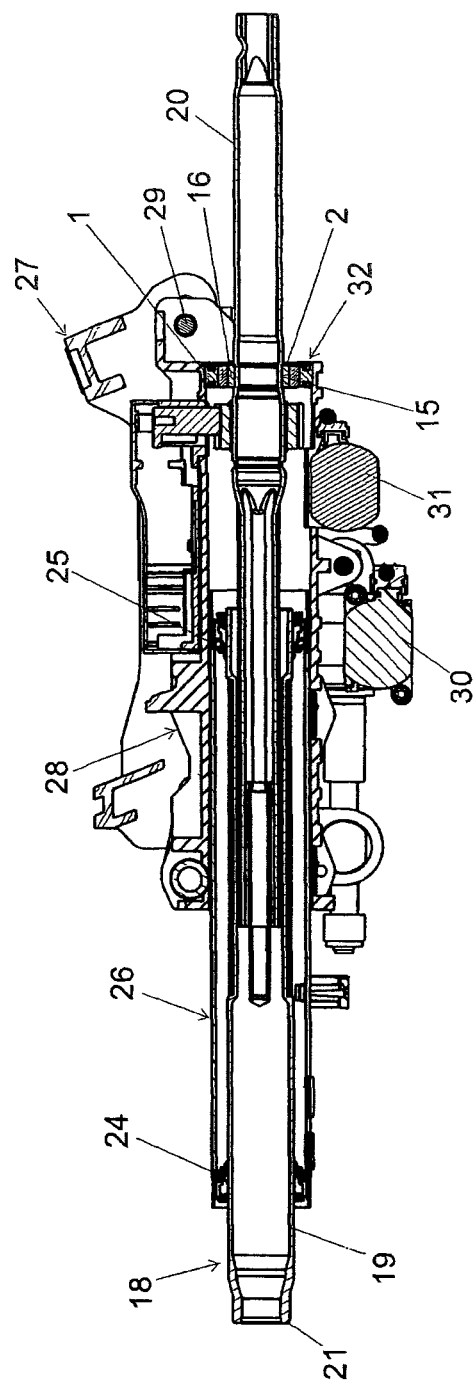
FIG. 11 is a side section view of a steering column through line AA of FIG. 10.

FIGS. 9 to 11 show one example for a possible configuration of a steering column for a motor vehicle, in which configuration a plain bearing according to the invention can be used. The steering column has a steering spindle 18 which comprises a first shaft 19 and a second shaft 20. The first shaft 19 which lies further to the rear in relation to the driving direction adjoins the steering wheel-side end of the steering spindle 18, that is to say the steering wheel is attached at its rear end 21 as viewed in the driving direction. The first shaft 19 is connected fixedly in terms of rotation but axially displaceably (=telescopic) to the second shaft 20 which lies further to the front in relation to the driving direction, is configured as a hollow shaft in this exemplary embodiment and protrudes into the first shaft 19 which is likewise configured as a hollow shaft.

The rear first shaft 19 is mounted rotatably with respect to a casing unit 26 of the steering column by means of first and second bearings 24, 25. The first and second bearings 24, 25 are configured as anti-friction bearings. The second shaft 20 is mounted rotatably in the third bearing, the plain bearing 32 according to the invention.

The steering column has a supporting unit 27 which is to be fastened to the body of the motor vehicle and on which a pivoting unit 28 of the steering column is mounted such that it can be pivoted about a pivoting axis 29. The pivotability of the pivoting unit 28 about the pivoting axis 29 serves for height and tilt adjustment of the steering column. The pivoting unit 28 receives the casing unit 26 in an axially displaceable manner, in order to make length adjustment of the steering column possible.

In the exemplary embodiment which is shown, the height and tilt adjustment and the length adjustment of the steering column take place by way of electric drive motors 30, 31. The drive motors actuate spindle drives, as is known. Instead of an electric adjustment of the steering column, the latter might also be manually adjustable. For this purpose, there might be a fixing apparatus which can be opened and closed manually, for example, in the open state of which the steering column can be adjusted and in the closed state of which the set position of the steering column is fixed. Manually or automatically adjustable steering columns are known in different embodiments. The type of adjustability of the steering column is not the subject matter of the present invention.

The front shaft 20 of the steering spindle 18 is mounted by way of a plain bearing 32 according to the invention. The plain bearing 32 therefore represents a third bearing for mounting the steering spindle 18, which third bearing is present in addition to the bearings 24, 25. As a result of the flexible connection between the inner ring 2 and the outer ring 1 via the intermediate pieces 6, deviations from the exactly coaxial arrangement of the shaft 20 in the region of the bearing point 15 and exactly parallel orientation of the shaft 20 with respect to the longitudinal centre axis 4 of the plain bearing 32 can be absorbed. Deviations of this type can occur, for example, by way of a configuration of the steering spindle 18 which is not exactly rectilinear and/or by way of orientations of the bearings 24, 25 which are not exactly coaxial. Without this function of said plain bearing 32, the construction would be redundant with regard to the additionally present bearings 24, 25 and the existing tolerance ranges would have to be very greatly restricted.

At the bearing point 15 of the second shaft 20, the second shaft 20 is configured with an annular groove 16, by way of which the plain bearing 32 supports the second shaft 20 against an axial displacement force.

The invention claimed is:

1. A plain bearing for a steering spindle of a steering column for a motor vehicle, comprising:
    an inner ring configured to receive and slidably mount the steering spindle therein;
    an outer ring disposed around said inner ring; and
    a plurality of compressible elastic intermediate pieces disposed between said inner ring and said outer ring and configured to position said inner ring within an interior of said outer ring such that said inner and outer rings are spaced apart from each other and concentric about a longitudinal central axis when said inner ring is not subjected to a force transverse to the central axis, and further being configured to be compressed between said inner and outer rings when a force is placed on said inner ring in a radial direction thereof, wherein an outer surface of said inner ring contacts an inner surface of said outer ring if the force on the inner ring exceeds a threshold limit.

2. The plain bearing of claim 1, further comprising:
    at least one recess defined in at least one of said outer ring or said inner ring; and at least one complimentary lug disposed on the other of said outer or inner ring, and respectively protruding either radially inward from said outer ring or outward from said inner ring, which lug engages in said at least one recess so as to couple said inner ring with said outer ring.

3. The plain bearing of claim 2, wherein there exists a predefined amount of clearance between said at least one lug and said at least one recess so as to permit play there between.

4. The plain bearing of claim 2, wherein said at least one lug comprises two or more lugs spaced apart about a circumference of said respective inner ring or outer ring from which said lugs protrude.

5. The plain bearing of claim 1, wherein said inner ring is a slotted ring.

6. The plain bearing of claim 1, wherein at least one of said inner ring and said outer ring is made from plastic.

7. The plain bearing of claim 1, wherein said plurality of compressible elastic intermediate pieces are made of an elastomeric material.

8. The plain bearing of claim 1, wherein said inner ring has defined on the outer circumferential surface thereof a plurality of depressions distributed about the outer circumference of the inner ring.

9. The plain bearing of claim 8, wherein each of said intermediate pieces protrudes into one each of said depressions.

10. The plain bearing of claim 1, wherein said inner ring further includes a plurality of inner surface depressions defined in an inner surface of said inner ring, which inner surface of said inner ring faces said central axis.

11. The plain bearing of claim 1, said outer ring includes a plurality of window openings defined in a side face thereof that penetrate into said outer ring in the central axial direction.

12. A steering column for a motor vehicle, comprising:
a steering spindle; and
a plain bearing coupled to said steering spindle so as to mount said steering spindle in
said steering column, said plain bearing having,
an inner ring slidably mounted on an outer surface of said steering spindle,
an outer ring disposed around said inner ring, and
a plurality of compressible elastic intermediate pieces disposed between said inner ring and said outer ring and configured to position said inner ring within an interior of said outer ring such that said inner and outer rings are spaced apart from each other and concentric about a longitudinal central axis when said inner ring is not subjected to a force transverse to the central axis, and further being configured to be compressed between said inner and outer rings when a force is placed on said inner ring in a radial direction thereof, wherein an outer surface of said inner ring contacts an inner surface of said outer ring if the force on the inner ring exceeds a threshold limit.

13. The steering column of claim 12, wherein said steering spindle comprises a first telescopic shaft and a second telescopic shaft slidably coupled to said first telescopic shaft such that said telescopic shafts are adjustable relative to each other in a longitudinal direction of said steering spindle, said plain bearing supporting at least one of said first or second telescopic shafts.

14. The steering column of claim 12, further comprising a first further bearing and a second further bearing, both mounted to said steering spindle at a steering-wheel side of said steering spindle.

* * * * *